Nov. 5, 1935.    H. FORD    2,020,054
AUTOMOBILE CHASSIS CONSTRUCTION
Filed May 27, 1933    2 Sheets-Sheet 2
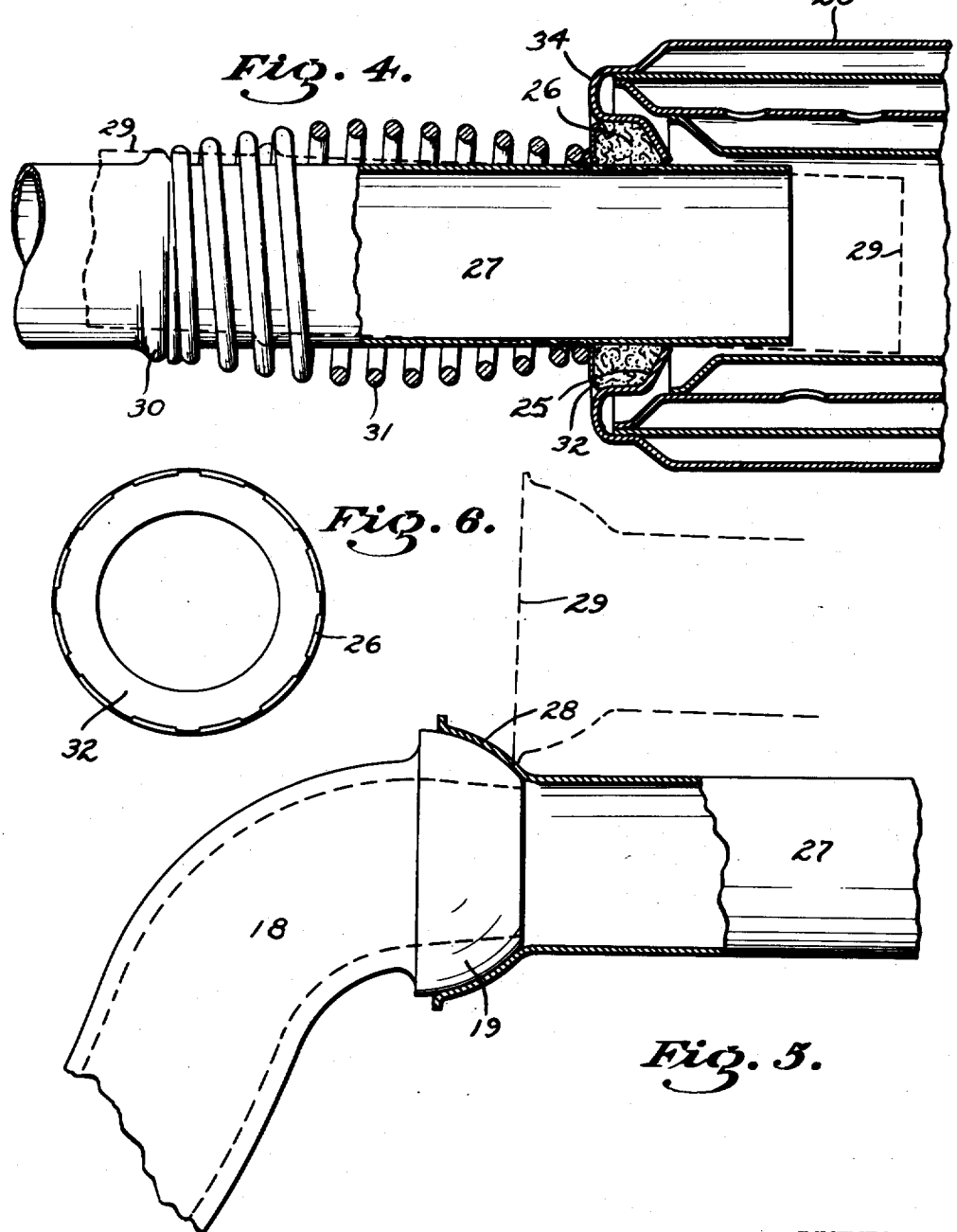
INVENTOR.
Henry Ford
BY
ATTORNEY.

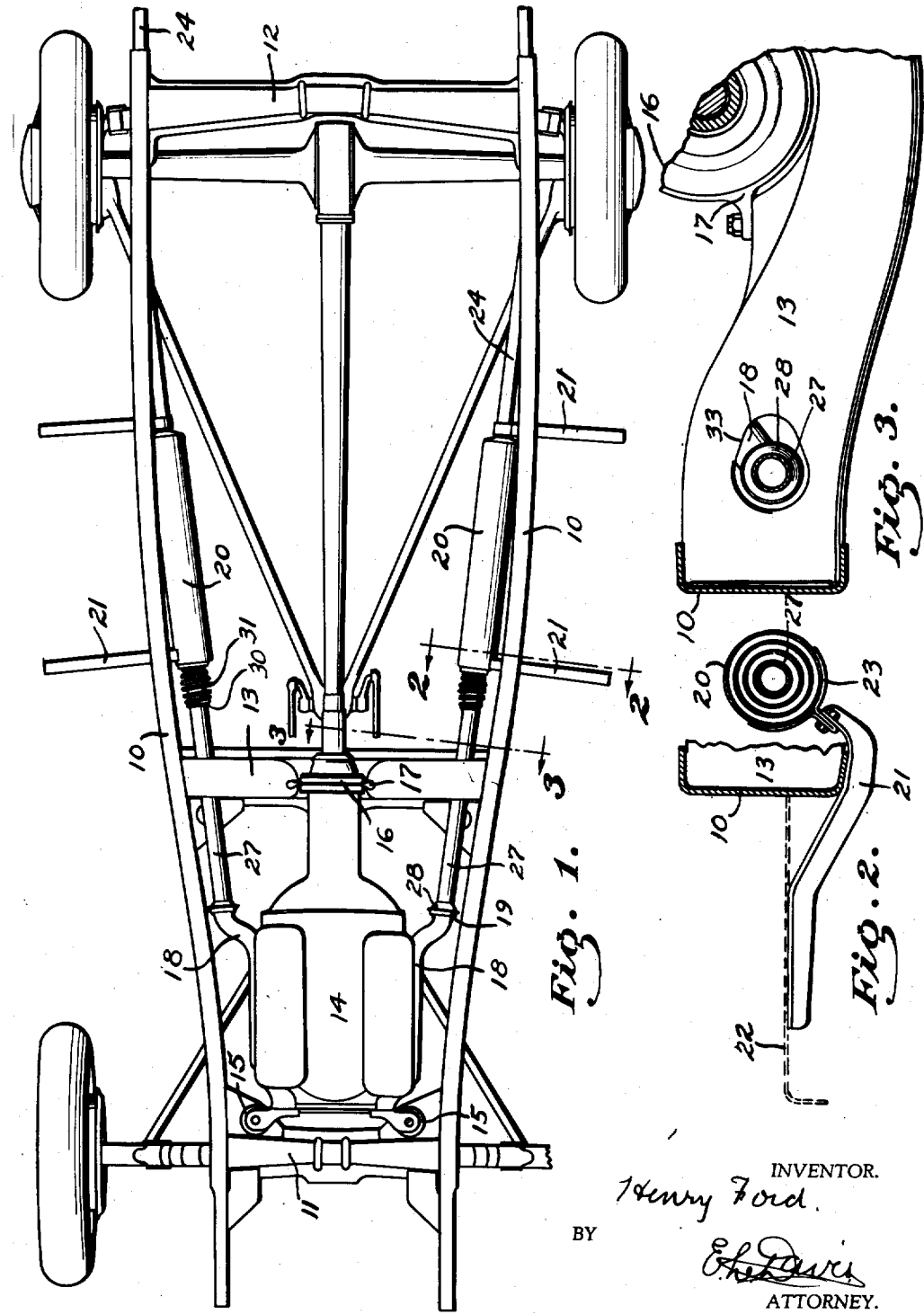

Patented Nov. 5, 1935

2,020,054

UNITED STATES PATENT OFFICE 2,020,054

AUTOMOBILE CHASSIS CONSTRUCTION

Henry Ford, Dearborn, Mich., assignor to Ford Motor Company, Dearborn, Mich., a corporation of Delaware Application May 27, 1933, Serial No. 673,195

15 Claims. (Cl. 180—54)

The object of my invention is to provide an automobile chassis construction of simple, durable and inexpensive construction.

More specifically, my invention relates to a chassis having its engine flexibly mounted therein for a limited vibratory movement. My engine is supported in the chassis frame by means of rubber engine mountings which permit a limited oscillation of the engine around its crank shaft whereby the torsional reaction of the engine will be dampened out. Such engine mountings are in general use and serve to eliminate vibration in the frame and body. In this respect they are very satisfactory. However, a disadvantage arises in connection with their use which is that the oscillating movement of the engine requires that a flexible exhaust pipe be inserted between the engine and the muffler, if the latter is fixed on the vehicle frame. On cars having a short wheel base it may be possible to support the exhaust pipe and muffler from only one point on the frame, allowing the unit to swing with the engine, but this construction invariably develops rattles and frequently sets up bending strains in the exhaust pipe, which causes same to fail after only comparatively short usage. For this reason most automobile manufacturers insert a short section of flexible tubing between the engine manifold and the exhaust pipe proper and are thereby allowed to fixedly secure the exhaust pipe and muffler to the frame. The disadvantage of the use of flexible tubing is that no such tubing, to the applicant's knowledge, will withstand the heat, water of condensation and constant flexing over a period corresponding to the life of the car.

In this disclosure a device is shown which compensates for the above mentioned relative movements without distorting or stressing any of the parts of the device and at the same time allows the several parts to be each rigidly constructed to thereby insure a useful life exceeding that of the vehicle with which it is associated.

With these and other objects in view my invention consists in the arrangement, construction and combination of the various parts of my improved device, as described in the specification, claimed in my claims, and illustrated in the accompanying drawings, in which:

Figure 1 shows a top view of my improved chassis.

Figure 2 shows a sectional view, taken on the line 2—2 of Figure 1.

Figure 3 shows a sectional view, taken on the line 3—3 of Figure 1.

Figure 4 shows a full-sized sectional view through the forward end of one muffler and associated portion of the exhaust pipe.

Figure 5 shows a full-sized sectional view through the connection between one engine manifold and the forward end of the exhaust pipe, and Figure 6 shows a plan view of the ring packing which is used in the connection shown in Figure 4.

Referring to the accompanying drawings, particularly to Figure 1, I have provided a chassis frame comprising a pair of side members 10, front and rear cross members 11 and 12, respectively, and a center cross member 13. The intermediate portion of each of the cross members 11 and 12 is connected to the intermediate portion of front and rear transverse springs, these springs extending outwardly where they are shackled to the respective ends of front and rear axles in the conventional manner. The motor used herein is an eight cylinder V-type engine which is numbered 14 in the drawings. The front end of the motor is supported on a pair of flexible rubber engine mountings 15 which are spaced laterally from the axis of the motor crank shaft, while the rear end of the motor is supported on an annular rubber ring 16 which surrounds the driving shaft of the motor. The rubber ring 16 is fixed to the intermediate portion of the cross member 13 by means of a bracket 17 which is vulcanized in the rubber. From the foregoing, it will be seen that the engine 14 is resiliently supported upon the front and center cross members so that a limited movement of the engine in all directions, particularly oscillatory movement around the crank shaft, is permitted.

Secured along the outer sides of the pair of motor cylinder blocks, I have provided a pair of exhaust manifolds 18 having their rearmost ends projecting rearwardly and towards the frame side members. The rear end of each of the manifolds 18 is machined as a spherical surface 19 with the axis of the exhaust passageway projecting rearwardly along the adjacent frame side member. Inasmuch as the engine used herein is of the V-type and is provided with two exhaust manifolds, I have provided two mufflers, one for each of said manifolds. These mufflers have been given the reference numeral 20 and each is composed of a plurality of concentric tube members having their end portions welded together. Suitable apertures are provided in all but the outer tube of each muffler so that the exhaust gas entering the inner tube will progressively flow the length of each ring-shaped space and be throttled when passing through the apertures in each tube, in the conventional manner. No claim is made herein to the particular type of muffler used, as my invention is applicable for use with any of the well-known types of mufflers.

Referring to Figure 2, means for securing the mufflers to their respective frame side members is provided wherein brackets 21 are secured to the lower edges of the side members, one end of each bracket extending outwardly from the chassis to form a running board support, the running board being shown by dotted lines 22. The other end of each bracket 21 extends inwardly and upwardly where it is detachably secured to a strip 23, this latter strip being spot-welded to the outer tube of the muffler 20. It will be noted that brackets 21 are secured to the frame adjacent to each end of the muffler 20, the forward pair of brackets being constructed as just described whereas the rearmost pair coact with the outlet pipes of the muffler to support same. These outlet pipes comprise tubes 24 which extend from the mufflers back along the frame side members to the rearmost end of the car.

It will be noted that the forward end of the outer tube of each muffler is formed integrally with a head 34 which forms a closure for the muffler and that a pocket 25 is pressed into the material of the head in concentric position with the innermost tube of the muffler. An annular ring of packing material 26 is inserted in the pocket 25, the bore of this ring being somewhat smaller than the smallest tube in the muffler.

Each muffler 20 is secured in position with its axis substantially aligned with the axis of the spherical end of the adjacent manifold 18, and a connecting pipe 27 extends between each spherical end 19 and the adjacent muffler. The end of the pipe 27 adjacent to the manifold is formed with a spherical socket 28 thereon which accurately fits the spherical end 19. The length of the tube 27 is sufficient so that when its spherical end 28 coacts with the spherical surface 19 the muffler end of the pipe will extend an inch or so through the packing ring 26 into the muffler. It is of course essential when installing this pipe to first insert the plain end of the pipe into the muffler, to position shown by dotted lines 29 whereby the opposite end of the pipe may be swung into axial alignment with the manifold. The pipe may then be withdrawn sufficiently to seat the socket 28 upon the spherical end of the manifold.

In order that the device may be assembled without the use of tools of any description, and in order that the packing ring may make a permanently tight joint with the pipe 27, and in order that expansion of the various parts, due to temperature changes, shall not affect the tightness of the joint, I have provided a spring 31 which resiliently urges the pipe 27 against the end of the manifold. The pipe 27 is provided with an annular outwardly extending rib 30 spaced about six inches forwardly of the forward end of the muffler and the spring 31 is interposed between the rib 30 and the packing 26. It will be noted that the outer face of the packing 26 is provided with a metallic washer 32 which has a plurality of prongs extending rearwardly from its periphery into the material of the packing. When the device has been assembled in position the spring 31 resiliently urges the pipe against the end of the manifold, nevertheless, if it is desirable to remove the pipe it may readily be forced rearwardly against the action of the spring 31 to position where it will clear the rearward end of the manifold, as shown by the dotted lines 29 in Figure 5.

It will be noted that the intermediate portion of the spring 31 is enlarged over the diameter of the end coils of the spring, the purpose of which is to insulate the spring from the heat of the exhaust pipe. The end coils of the spring do no actual work so that it is immaterial as to whether or not the temper of these coils, the first one and one-half turns of the spring, is maintained. The heat of the exhaust pipe may draw the temper of the end coils of the spring but inasmuch as the center coils are spaced from the pipe and are disposed in an air current when the vehicle is normally operating, these coils never attain a temperature sufficient to draw the temper from the springs.

It will be noted that the pipe 27 extends through elongated openings 33 in the respective ends of the center cross members 13, these openings being shaped so that the pipe 27 may be swung laterally sufficient to clear the spherical end of the manifold.

In the structure just described the mufflers have been shown as being rigidly secured to the frame side members, however, it may be desirable to secure the mufflers to the frame by means of rubber mountings, similar in principle to the rubber mountings which support the engine but being of course smaller in size.

Among the many advantages arising from the use of my improved device, it may be well to mention that when the engine of the vehicle oscillates in the rubber mountings 15 and 16, the relative movement between the exhaust pipes 27 and manifolds 18 do not cause distortion or stress the parts in any way. Further, due to the provision of the springs 31, the exhaust pipes may be quickly assembled or disconnected from the engine without the use of tools of any description so that the installation and servicing of the engine is especially simple.

Some changes may be made in the arrangement, construction, and combination of the various parts of my improved device without departing from the spirit of my invention, and it is my intention to cover by my claims such changes as may reasonably be included within the scope thereof.

I claim as my invention:

1. A motor chassis construction comprising, a frame, a motor mounted in said frame, a muffler mounted in said frame, an exhaust pipe extending between the exhaust outlet part of said motor and said muffler, the respective ends of said pipe forming gas-tight joints with said motor and muffler, respectively, and a spring resiliently effecting said gas-tight joints, said joints being detachable and said pipe removable by counteracting said spring only.

2. A chassis construction, as claimed in claim 1, wherein said joints are capable of a limited universal angular movement so as to compensate for relative movements between said engine and muffler.

3. A chassis construction, as claimed in claim 1, wherein the coacting parts of one of said joints are resiliently urged together.

4. A chassis construction, as claimed in claim 1, wherein one of said joints comprises ball and socket members.

5. A chassis construction comprising, a frame, a motor mounted in said frame so as to be capable of limited vibratory movement relative to said frame, an exhaust manifold fixed to said motor for movement therewith, the outlet end of said manifold having a one-half flexible joint formed thereon, a muffler fixedly secured to said frame, an exhaust pipe extending between said muffler and manifold having the other half of said joint formed thereon, a flexible packing ring secured between the adjacent end of said muffler and said exhaust pipe, and a compression spring having one end abutting said packing ring and the other end fixed to the intermediate portion of said pipe so as to resiliently urge the exhaust pipe half of said joint into engagement with said manifold.

6. A construction, as claimed in claim 5, wherein the joint between said manifold and exhaust pipe is of a spherical ball and socket type.

7. A construction, as claimed in claim 5, wherein said compression spring is barrel-shaped, for the purpose described.

8. A chassis construction comprising, a frame, a V-type internal combustion engine resiliently mounted in said frame so as to be capable of a limited oscillating movement therein, exhaust manifolds fixed to the outer sides of the cylinder blocks of said motor, the outlet ends of said manifolds each having half of a flexible joint formed thereon, a pair of mufflers fixedly secured to the respective sides of said frame in substantial alignment with said manifolds, and an exhaust pipe extending between each of said manifolds and the adjacent muffler, the ends of said pipes adjacent to said manifolds having the other portions of said flexible joints formed thereon, a flexible packing ring secured between each muffler and the adjacent end of each pipe, and a compression spring surrounding each pipe having one end abutting the adjacent packing ring and the other end fixed to the intermediate portion of its pipe, for the purpose described.

9. A motor chassis construction comprising, a frame, a motor resiliently mounted in said frame having an exhaust manifold fixedly secured thereto, a muffler fixedly secured to said frame, an exhaust pipe forming an exhaust passageway between said manifold and said muffler, a pair of flexible joints one of which is positioned between said manifold and exhaust pipe and the other of which is positioned between said exhaust pipe and muffler, and means for resiliently urging said exhaust pipe towards one of said joints so as to form a gas-tight joint therebetween.

10. A device, as claimed in claim 9, wherein said means for resiliently urging said exhaust pipe towards one of said joints also urges the other of said joints to its gas-tight position.

11. A device, as claimed in claim 9, wherein said resilient means comprises a barrel-shaped spring which is disposed around the exhaust pipe.

12. A motor chassis construction comprising, a frame, a motor resiliently mounted in said frame having an exhaust manifold fixedly secured thereto, the outlet end of said manifold having one-half of a flexible joint formed thereon, a muffler fixedly secured to said frame, an exhaust pipe forming an exhaust passageway between said muffler and said manifold, said exhaust pipe having the other half of said flexible joint formed on the pipe end which coacts with said flexible joint half, and means for resiliently urging said exhaust pipe towards said manifold so as to resiliently maintain said joint in a sealed condition.

13. A motor chassis construction comprising, a frame, a motor resiliently mounted in said frame having an exhaust manifold fixedly secured thereto, a muffler mounted in said frame, an exhaust pipe extending between the outlet end of said manifold and the entrance end of said muffler, said exhaust pipe forming gas-tight joints with said manifold and muffler, respectively, a packing ring disposed around said exhaust pipe forming a seal for one of said joints, and a compression spring having one end abutting said ring with the other end fixed to said pipe so as to resiliently maintain said seal, said exhaust pipe being removable by the counteraction of said spring only.

14. A motor chassis construction comprising, a frame, a motor resiliently mounted in said frame, said motor having an exhaust manifold fixedly secured thereto, a muffler mounted in said frame, an exhaust pipe extending between the outlet end of said manifold and said muffler, the respective ends of said pipe forming quickly detachable gas tight joints with said manifold and muffler, said joints being capable of a limited universal angular movement.

15. A motor chassis construction comprising, a frame, a motor resiliently mounted in said frame, said motor having an exhaust manifold fixedly secured thereto, a muffler mounted in said frame, an exhaust pipe extending between the outlet end of said manifold and said muffler, the respective ends of said pipe forming quickly detachable gas tight joints with said manifold and muffler, said joints being capable of a limited universal angular movement, and a spring disposed around the muffler end of said pipe resiliently urging the pipe lengthwise into engagement with said manifold for the purpose described.

HENRY FORD.